US011143284B2

(12) United States Patent
Diffin et al.

(10) Patent No.: US 11,143,284 B2
(45) Date of Patent: Oct. 12, 2021

(54) FLOATING WORM BEARING BORE OFFSET

(71) Applicant: STEERING SOLUTIONS IP HOLDING CORPORATION, Saginaw, MI (US)

(72) Inventors: Daniel J. Diffin, Freeland, MI (US); Ryan D. Harris, Clio, MI (US); Joshua D. Mullins, Bay City, MI (US); William J. Logan, Owosso, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 50 days.

(21) Appl. No.: 16/295,516

(22) Filed: Mar. 7, 2019

(65) Prior Publication Data

US 2019/0277385 A1 Sep. 12, 2019

Related U.S. Application Data

(60) Provisional application No. 62/640,234, filed on Mar. 8, 2018.

(51) Int. Cl.
*F16H 55/17* (2006.01)
*F16H 1/16* (2006.01)
*F16H 57/021* (2012.01)
*B62D 5/04* (2006.01)

(52) U.S. Cl.
CPC .............. *F16H 55/17* (2013.01); *F16H 1/16* (2013.01); *B62D 5/0409* (2013.01); *F16C 2361/61* (2013.01); *F16H 2057/0213* (2013.01)

(58) Field of Classification Search
CPC ........ F16H 1/16; F16H 55/17; F16C 2361/61; B62D 5/0409
See application file for complete search history.

(56) References Cited

U.S. PATENT DOCUMENTS

| 2003/0097895 A1 | 5/2003 | Cashatt |
| 2000/4222036 | 11/2004 | Berhard et al. |

FOREIGN PATENT DOCUMENTS

| CN | 102421654 A | 4/2012 | |
| CN | 104203721 A | 12/2014 | |
| CN | 105008208 A | 10/2015 | |
| CN | 105398494 A | 3/2016 | |
| CN | 107416015 A | 12/2017 | |
| CN | 207015414 U | 2/2018 | |
| WO | WO-2006051034 A1 * | 5/2006 | ............. F16H 55/24 |
| WO | WO-2010127915 A1 * | 11/2010 | .......... B62D 5/0409 |
| WO | WO-2013152996 A1 * | 10/2013 | ............... B62D 3/12 |
| WO | WO-2014135382 A1 * | 9/2014 | ............. F16H 55/24 |

OTHER PUBLICATIONS

Chinese Office Action With Translation Corresponding To Application No. 2019101755355 dated Jun. 17, 2021.

* cited by examiner

*Primary Examiner* — Thomas C Diaz
(74) *Attorney, Agent, or Firm* — Dickinson Wright PLLC

(57) ABSTRACT

A power steering assembly is provided. The power steering assembly may include a housing, a first bearing, a second bearing, a worm, and a worm gear. The first bearing is disposed within the housing and defines a first central axis. The second bearing is disposed within the housing and defines a second central axis offset from the first central axis. The first bearing and the second bearing are arranged with the housing such that the second bearing is movable to align the first central axis with the second central axis responsive to a load applied to the second bearing.

20 Claims, 5 Drawing Sheets

FLOATING WORM BEARING BORE OFFSET

CROSS-REFERENCE TO RELATED APPLICATIONS

This application claims the benefit of U.S. Provisional Patent Application Ser. No. 62/640,234 filed, Mar. 8, 2018, which is incorporated herein by reference in its entirety.

BACKGROUND

Vehicles may employ a power steering system. The power steering system may provide a torque assist to a steering shaft of the vehicle through a worm/worm gear reduction assembly to pivot at least one steerable vehicle wheel. The worm/worm gear reduction assembly may wear over time and may impact an overall power steering system feel and noise, vibration, and harshness (NVH) performance. The wear over time reduces friction between the worm/worm gear reduction assembly and may cause a reduction in NVH performance.

SUMMARY

According to an embodiment of the present disclosure, a power steering system is provided. The power steering system includes a worm gear, a worm, a first bearing, and a second bearing. The worm is rotatably supported by the first bearing and the second bearing. The first bearing defines a first bearing bore that extends along a first bearing axis. The second bearing defines a second bearing bore that extends along a second bearing axis and is offset from the first bearing bore. Responsive to a load applied to at least one of the first bearing and the second bearing, the first bearing axis and the second bearing axis become coaxial with the one another along a shared bearing axis.

According to another embodiment of the present disclosure, a power steering system is provided. The power steering system includes a worm gear, a worm, a first bearing, and a second bearing. The worm is rotatably supported by the first bearing and the second bearing. The first bearing extending along a first bearing axis and the second bearing extending along a second bearing axis that is different from the first bearing axis. The first bearing axis and the second bearing axis being coaxial with one another, responsive to a load applied to at least one of the first bearing and the second bearing.

According to another embodiment of the present disclosure, a power steering assembly is provided. The power steering assembly includes a housing, a first bearing, a second bearing, a worm, and a worm gear. The first bearing is disposed within the housing and defines a first central axis. The second bearing is disposed within the housing and defines a second central axis offset from the first central axis. The first bearing and the second bearing are arranged with the housing such that the second bearing is movable to align the first central axis with the second central axis responsive to a load applied to the second bearing. The worm includes a threaded portion. The worm extends between and is supported by the first bearing and the second bearing. The worm gear is disposed within the housing for meshing with the threaded portion of the worm.

According to yet another embodiment of the present disclosure, a power steering assembly is provided. The power steering assembly includes a housing, a fixed bearing, a worm, and a floating bearing. The fixed bearing is disposed within the housing and defines a first bore and a first central axis. The worm includes a first worm end and a second worm end. The worm is supported by the fixed bearing at the first worm end. The floating bearing is disposed within the housing and supports the worm at the second worm end. The floating bearing defines a second bore and a second central axis. The floating bearing is arranged within the housing to move between at least a first and a second position. The first position is defined as a position in which the bearings are arranged with one another such that the first central axis and the second central axis are offset from one another. The second position is defined as a position in which the bearings are arranged with one another such that the first central axis and the second central axis are coaxial.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
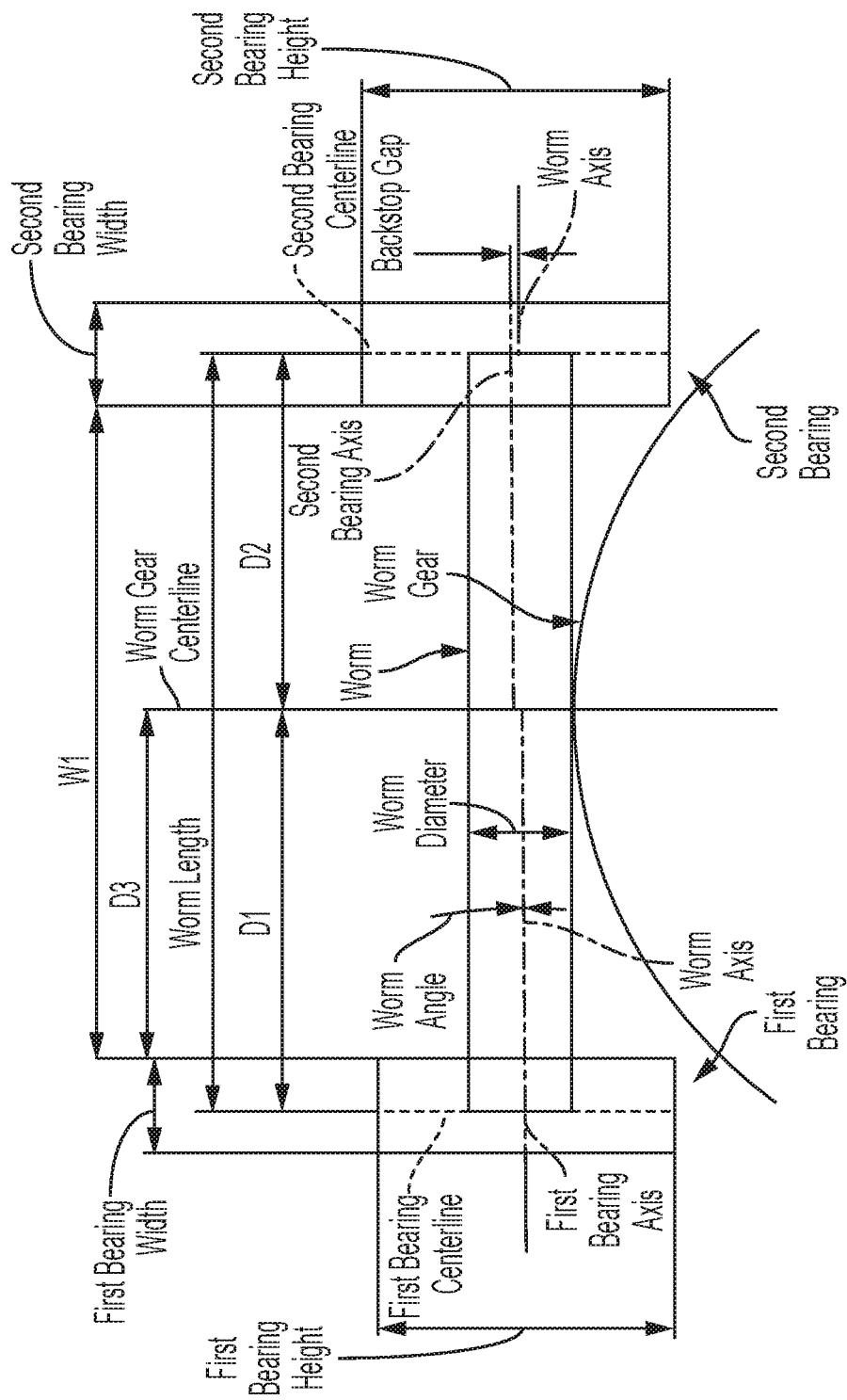
FIG. 1 is a side schematic view, in cross-section, illustrating an example of a portion of a power steering system shown in a first position.

Referring now to the Figures, where the invention will be described with reference to specific embodiments, without limiting same, FIG. 1 is a schematic diagram illustrating an example of a power steering system. The power steering system may be an electric power steering system. The power steering system includes a worm, a first bearing or a first bearing assembly, a second bearing or a second bearing assembly, and a worm gear.

The worm, the first bearing, the second bearing, and the worm gear may be disposed within a housing assembly. The housing assembly may include a first housing and a second housing. The first housing may define an interior cavity that receives and houses the worm gear and a portion of the worm. The second housing may be operatively connected to the first housing. The second housing may be an elongated housing that extends along a second axis between a first end and a second end. The second axis may be disposed transverse to a first axis of the worm gear.

The second housing defines an interior cavity that extends between the first end and the second end. The interior cavity may receive and house at least a portion of the worm.

The worm may extend between a first worm end and a second worm end along a worm axis. The worm may have a worm length measured between the first worm end and the second worm end along the worm axis. The worm may also have a worm diameter. Threads of the worm are in meshed engagement with the worm gear such that rotation of the worm about the worm axis causes rotation of the worm gear about the first axis of the worm gear.

The worm is rotatably supported at the first worm end by the first bearing that may be disposed proximate the first end of the second housing and the worm is rotatably supported at the second worm end by the second bearing that may be disposed proximate the second end of the second housing. The first bearing is disposed about the first worm end. The second bearing is disposed about the second worm end.

A bearing shared axis may extend between a first bearing axis of the first bearing and a second bearing axis of the second bearing when the bearings are in a second position as further described herein.

The first bearing may axially extend along and be disposed about the first bearing axis. The first bearing may have a first bearing width that extends between a first bearing first axial end and a first bearing second axial end along the first bearing axis. The first bearing may at least partially define a first bearing bore that extends from the first bearing first axial end to the first bearing second axial end along the first bearing axis.

The first worm end of the worm may extend at least partially into the first bearing bore. A first distance, D1, may be measured from the first worm end, which may be disposed proximate the first bearing centerline, to a worm gear centerline that is disposed generally transverse to the first axis of the worm gear.

The first bearing may radially extend along a first bearing centerline that is disposed generally transverse to the bearing shared axis and the first bearing axis. The first bearing may have a first bearing height or diameter that extends between a first bearing first radial end and a first bearing second radial end along the first bearing centerline.

The second bearing may be axially spaced apart from the first bearing. The second bearing may axially extend along a second bearing axis that may be disposed generally coaxial with the bearing shared axis when the bearings are oriented in a second position as further described herein. The second bearing may have a second bearing width that extends between a second bearing first axial end and a second bearing second axial end along the second bearing axis. The second bearing may partially define a second bearing bore that extends from the second bearing first axial end to the second bearing second axial end along the second bearing axis. A width, W1, may be measured from the first bearing second axial end to the second bearing second axial end.

The second worm end of the worm may extend at least partially into the second bearing bore. A second distance, D2, may be measured from the second worm end, which may be disposed proximate the second bearing centerline, to the worm gear centerline.

The second bearing may radially extend along a second bearing centerline that may be disposed generally transverse to the bearing shared axis and the second bearing axis. The second bearing may have a second bearing height or diameter that extends between a second bearing first radial end and a second bearing second radial end along the first bearing centerline. The second bearing may be oriented or sized differently than the first bearing such that the second bearing axis is radially offset from the worm axis defining a backstop gap. In at least one embodiment, the second bearing axis may be radially offset with respect to the first bearing axis or different from the first bearing axis when the bearings are in a first position as further described herein.

At least one of the first bearing and/or the second bearing is arranged to float or travel relative to the other of the first bearing and/or the second bearing under a spring 33 preload to reduce friction variation due to build variations or tolerances, thermal effects, or wear. The float or travel of at least one of the first bearing and/or the second bearing may cause the worm to float such that a first centerline distance measured between the first axis of the worm gear and the first bearing axis is greater than a second centerline distance measured between the second bearing axis or the worm axis and the first axis of the worm gear.

The floating may affect or vary a mesh between the worm and the worm gear such that a moment is applied to the opposite bearing by a worm angle measured between the worm axis and the bearing shared axis or a bearing axis of a bore of the non-floating bearing (e.g. the first bearing), as shown in FIG. 1. In an attempt to account for the worm angle created by the floating action of, for example, the first bearing relative to the second bearing, a second bearing bore of the second bearing may have a radial offset relative to the first bearing bore of the first bearing. In this configuration, the first bearing may move away from the worm gear, in a first adjustment direction, while the second bearing may move towards the worm gear, in a second adjustment direction disposed opposite the first adjustment direction responsive to a load applied to at least one of the first bearing and/or the second bearing. The first bearing bore and the first bearing axis may be radially offset in a first direction and the second bearing bore and the second bearing axis may be radially offset in a second direction disposed opposite the first direction.

Figure 2:
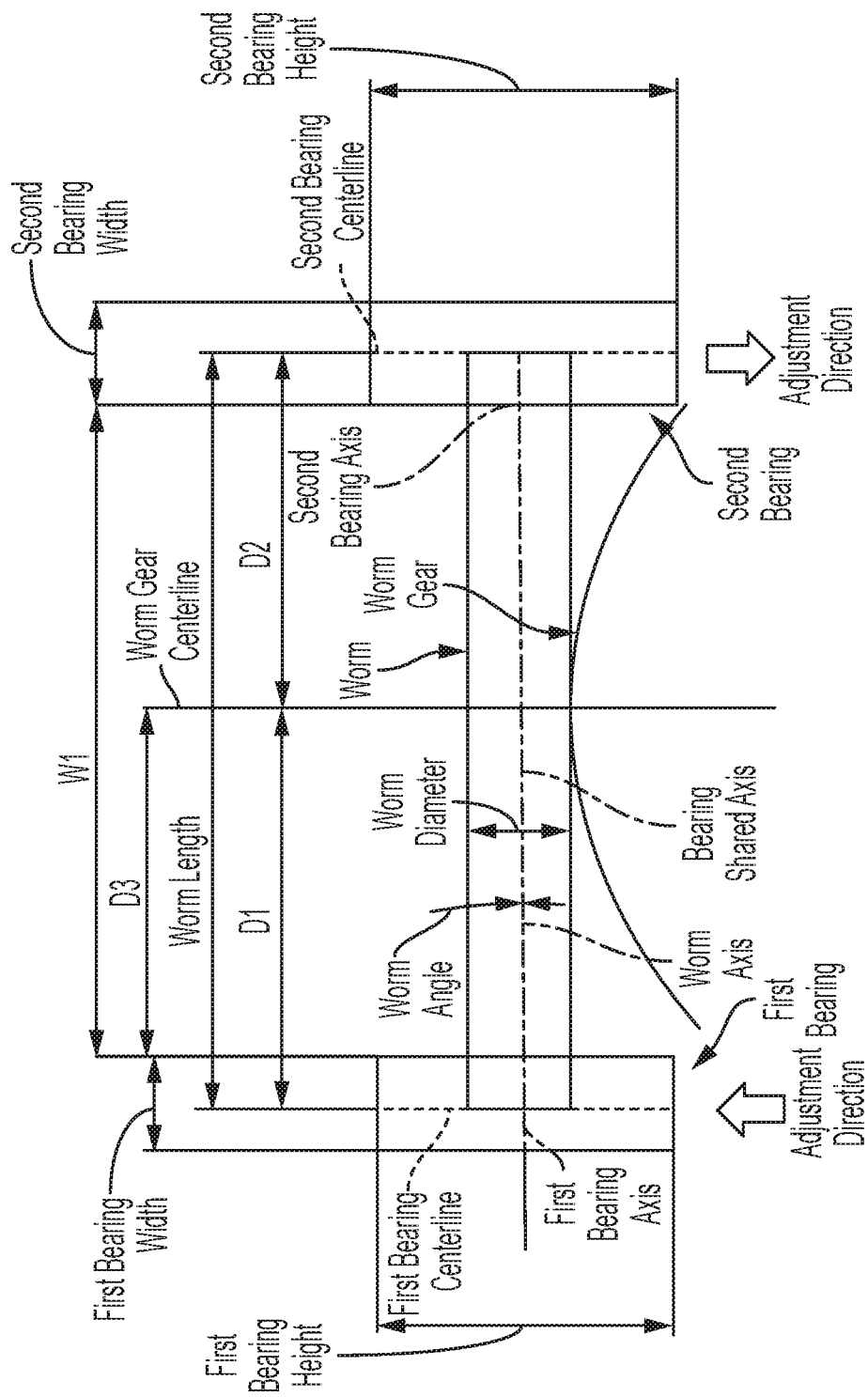
FIG. 2 is a side schematic view, in cross-section, illustrating an example of the portion of the power steering system of FIG. 1 shown in a second position.

The offsets between the first bearing bore and the second bearing bore or the first bearing axis and the second bearing axis may be balanced such that under loading, e.g. loads greater than a threshold, the first bearing may be pushed against its travel limit within the first bearing bore and the bearings become coaxial along the shared bearing axis and the worm angle approaches zero, as shown in FIG. 2, while maintaining the backstop gap between the worm axis and the second bearing axis. This orients the first bearing and the second bearing in a position that improves bearing life and noise, vibration, and harshness effects while under high loads.

Figure 3:
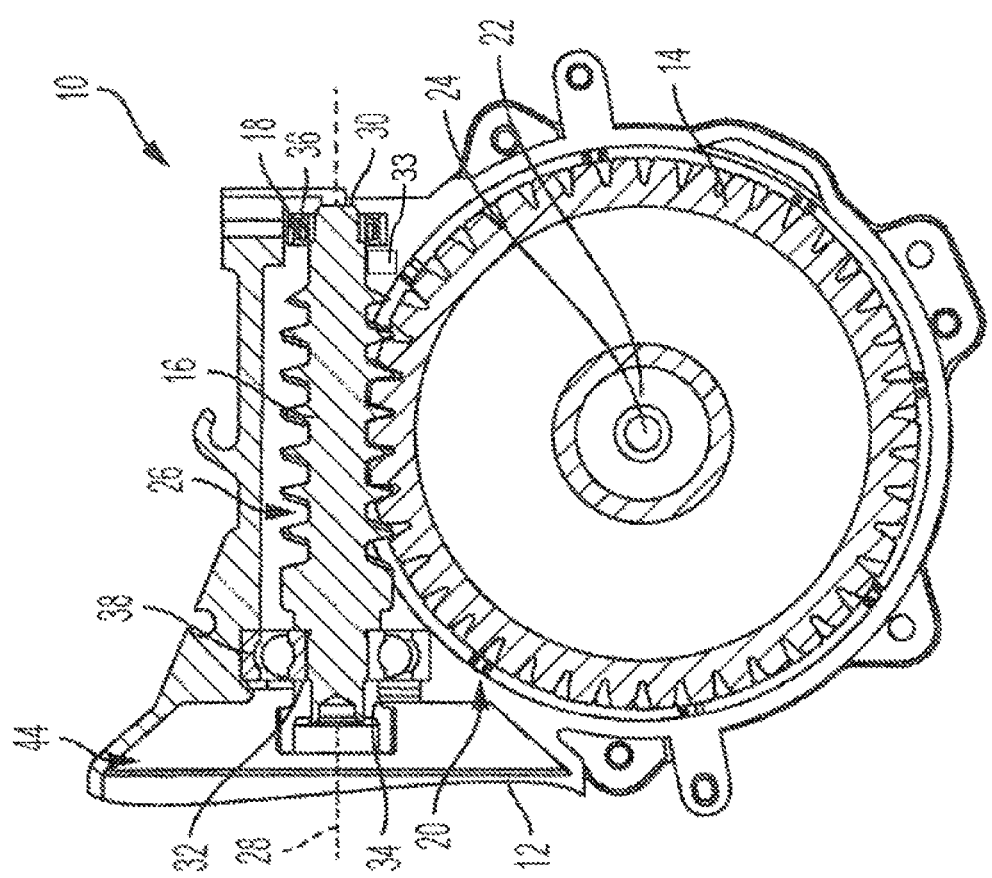
FIG. 3 is a side view, in partial cross-section, of an example of a portion of a power steering assembly.

FIG. 3 illustrates an example of a portion of a power steering assembly, referred to generally as a power steering assembly 10 herein. The power steering assembly 10 may be an electric power steering gear box or the like. The power steering assembly 10 may include a housing 12, a worm gear 14, a worm 16, and a compensation mechanism 18.

The housing 12 may define a first interior cavity portion 20 that receives and houses the worm gear 14 and a portion of a first control shaft 22. At least a portion of the first control shaft 22 extends through the worm gear 14 and the housing 12 along a first axis 24. The housing 12 may also define a second interior cavity portion 26 that extends along a second axis 28 between a first end 30 and a second end 32. The second axis 28 may be oriented transverse to the first axis 24.

The second interior cavity portion 26 may receive and house at least a portion of the worm 16. Threads of the worm 16 may be arranged to engage the worm gear 14 such that rotation of the worm 16 about the second axis 28 causes rotation of the worm gear 14 and therefore rotation of the first control shaft 22 about the first axis 24. The worm 16 may be defined by at least a portion of a second control shaft 34 that extends along the second axis and extends at least partially beyond the second end 32. The second control shaft 34 may be rotatably supported by a first worm bearing 36 that is disposed proximate the first end 30 of the second interior cavity portion 26 and a second worm bearing 38 that is disposed proximate the second end 32 of the second interior cavity portion 26. The first end 30 of the second interior cavity portion 26 also may define a spring bore (not shown). The spring bore may extend along a spring bore axis that is oriented generally perpendicular to the second axis 28.

A third interior cavity portion 44 of the housing 12 may extend from the second end 32 of the second interior cavity portion 26. The third interior cavity portion 44 may be a motor cone housing. At least a portion of the second control shaft 34 may extend into and at least partially through the third interior cavity portion 44.

Figure 4:
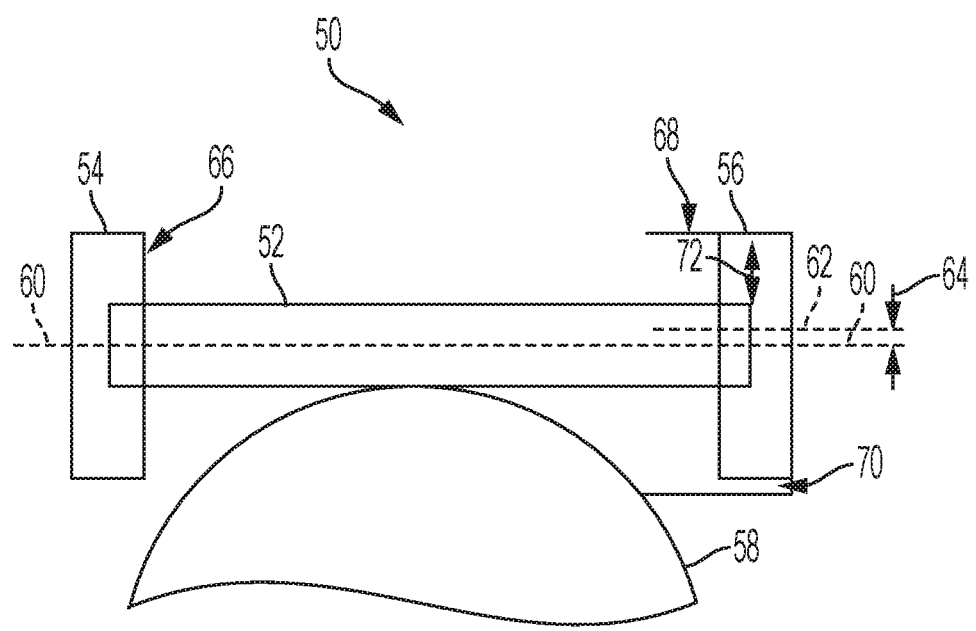
FIG. 4 is a side view, in cross-section, of an example of a portion of a power steering system.

FIG. 4 is a schematic diagram illustrating an example of a power steering assembly, referred to generally as a power steering assembly 50 herein. The power steering assembly 50 may operate with a vehicle to assist a driver with steering inputs. The power steering assembly 50 may be an electric power steering system. The power steering assembly 50 may include a worm 52, a first bearing 54, a second bearing 56, and a worm gear 58. The worm 52, the first bearing 54, the second bearing 56, and the worm gear 58 may be disposed within a housing (not shown in FIG. 4). The worm 52 and the worm gear 58 may each include teeth to mesh with one another during operation of the power steering assembly 50 to assist in transferring torque to the worm gear.

The first bearing 54 may define a first central axis 60. The second bearing 56 may define a second central axis 62. The first bearing 54 and the second bearing 56 may be arranged with one another such that a gap 64 is defined between the first central axis 60 and the second central axis 62.

The first bearing 54 may define a first bore 66. The first bore 66 may be sized to receive the first bearing 54 and to retain the first bearing 54 in a fixed position. The first bearing 54 may also be referred to as a fixed bearing herein. The worm 52 and the housing may be arranged with one another such that a first end of the worm at least partially extends into the first bore 66.

The second bearing 56 may be arranged with the housing to move between at least a first position and a second position. The first position may be defined as a position in which the bearings are arranged with one another such that the first central axis 60 and the second central axis 62 are offset from one another as represented by the gap 64. The second position may be defined as a position in which the bearings are arranged with one another such that the first central axis 60 and the second central axis 62 are coaxial. The second bearing 56 may at least partially define a second bore 68. The second bore 68 may be arranged with the housing such that a second end of the worm 52 at least partially extends within the second bore 68. The second bore 68 may be sized to define a clearance region 70 between a side of the second bearing 56 and a surface of the second bore 68. The clearance region 70 may provide space for movement of the second bearing 56 as represented by arrow 72. The second bearing 56 may be referred to as a floating bearing herein.

Each of the first bore 66 and the second bore 68 may be sized to assist in managing positions of each of the first bearing 54 and the second bearing 56 relative to the first central axis 60.

Figure 6:
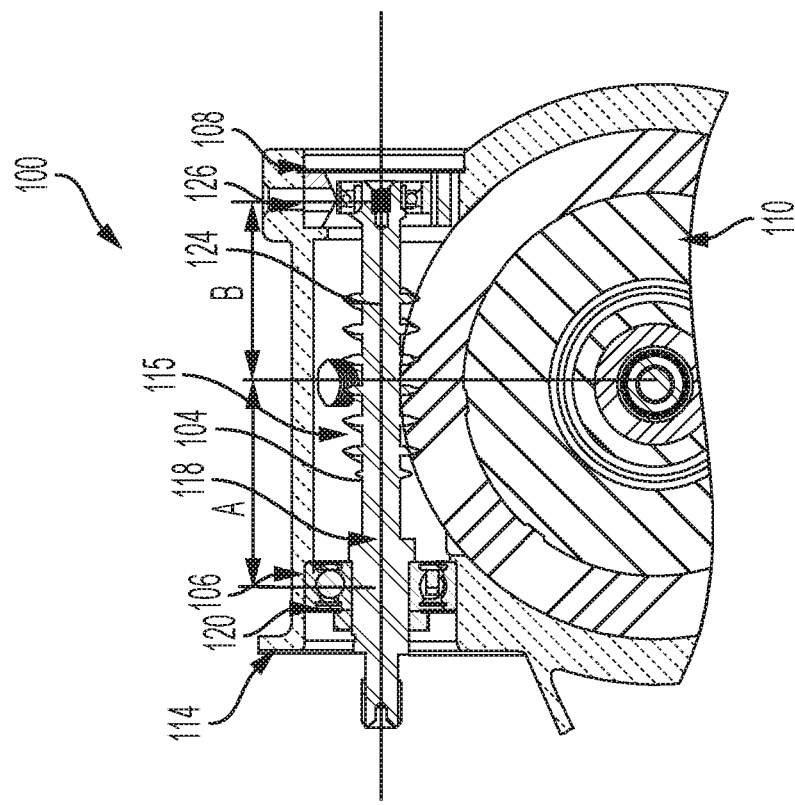
FIG. 6 is a side view, in cross-section, illustrating an example of a portion of a power steering system shown in a second position.
Figure 5:
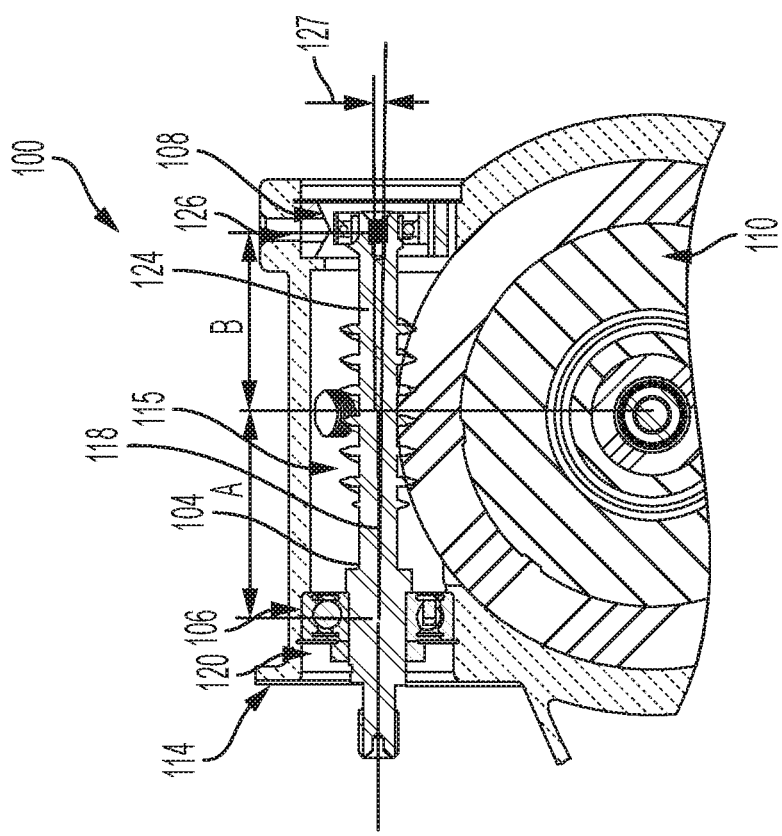
FIG. 5 is a side schematic view, in cross-section, illustrating an example of a portion of a power steering system shown in a first position.

FIGS. 5 and 6 are side views, in cross-section, illustrating an example of a portion of a steering assembly, referred to generally as a steering assembly 100 herein. In FIG. 5, the steering assembly 100 is shown in a first position. In FIG. 6, the steering assembly 100 is shown in a second position. The steering assembly 100 may include a worm 104, a first bearing 106, a second bearing 108, and a worm gear 110. The worm 104, the first bearing 106, the second bearing 108, and the worm gear 110 may be disposed within a housing 114. The worm 104 may include a threaded portion 115 between a first worm end and a second worm end. The threaded portion 115 may be for meshing with teeth of the worm gear 110. The worm 104 may extend between and be supported by the first bearing 106 and the second bearing 108.

The first bearing 106 may be fixed within the housing and may also be referred to as a fixed bearing herein. The first bearing 106 may define a first central axis 118 and may at least partially define a first bearing bore 120. The first bearing bore 120 may be sized to retain the first bearing 106 in a substantially fixed position. The first worm end of the worm 104 may at least partially extend into the first bearing bore 120. The second bearing 108 may define a second central axis 124 and may at least partially define a second bearing bore 126. The second end of the worm 104 may at least partially extend into the second bearing bore 126. A configuration of the steering assembly 100 shown in FIG. 5 may be such that the first central axis 118 and the second central axis 124 are offset from one another to define the first position mentioned above.

In the first position, the first central axis 118 and the second central axis 124 may be offset from one another as represented by gap 127. The first bearing 106 and the second bearing 108 may be arranged within the housing 114 such that the second bearing 108 is movable to align the first central axis 118 with the second central axis 124 responsive to a load applied to the second bearing 108. A configuration of the steering assembly 100 shown in FIG. 6 may define the second position described above. In the second position, the second bearing 108 has moved within the second bearing bore 126 such that the first central axis 118 and the second central axis 124 are aligned in a coaxial relationship.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the present disclosure, it is claimed:

1. A power steering system comprising:
   a worm gear; and
   a worm extending along a worm axis between a first worm end and a second worm end, the worm in meshed engagement with the worm gear, the worm is rotatably supported by a first bearing and a second bearing,
   the first bearing defining a first bearing bore that extends along a first bearing axis and the second bearing defining a second bearing bore that extends along a second bearing axis and is offset from the first bearing bore, at least one of the first bearing and the second bearing being preloaded by a spring such that the first bearing and second bearing are axially offset in a direction away from the worm gear, and the first bearing and the second bearing becoming coaxial with each other along a shared bearing axis in response to a load applied to at least one of the first bearing and the second bearing.

2. The system of claim 1, wherein the first bearing bore is offset in a first direction and the second bearing bore is offset in a second direction opposite the first direction.

3. The system of claim 1, wherein a worm angle is defined between the worm axis and the first bearing axis.

4. The system of claim 3, wherein responsive to the load applied to at least one of the first bearing and the second bearing, the worm angle approaches zero.

5. The system of claim 1, wherein the first worm end at least partially extends into the first bearing bore.

6. The system of claim 1, wherein the second worm end at least partially extends into the second bearing bore.

7. The system of claim 1, wherein the first bearing bore is sized to retain the first bearing in a fixed position and the second bearing bore is sized to provide clearance between at least one side of the second bearing and a surface of the second bearing bore.

8. A power steering assembly comprising:
a housing;
a worm gear;
a first bearing disposed within the housing and defining a first central axis;
a second bearing disposed within the housing and preloaded towards a second central axis offset from the first central axis in a direction away from the worm gear, the first bearing and the second bearing being arranged with the housing such that the second bearing is movable to align the first central axis with the second central axis responsive to a load applied to the second bearing;
a worm at least partially disposed within the housing and including a threaded portion, the worm extending between and supported by the first bearing and the second bearing; and
the worm gear disposed within the housing for meshing with the threaded portion of the worm.

9. The assembly of claim 8, wherein the housing comprises a first bore to receive the first bearing and a second bore to receive the second bearing, the first bore sized to retain the first bearing in a fixed position and the second bore sized to provide clearance between at least one side of the second bearing and a surface of the second bore.

10. The assembly of claim 9, wherein the clearance between the at least one side of the second bearing and the surface of the second bore is sized such that the second bearing may move to align the second central axis with the first central axis.

11. The assembly of claim 9, wherein the worm includes a first worm end and a second worm end, the first worm end at least partially extending into the first bore.

12. The assembly of claim 9, wherein the worm includes a first worm end and a second worm end, the second worm end at least partially extending into the second bore.

13. The assembly of claim 8, wherein the second central axis is offset from the first central axis such that responsive to the load being greater than a load threshold, the second bearing moves so the first central axis and the second central axis are coaxial.

14. The assembly of claim 8, wherein the second bearing defines a bearing centerline oriented substantially transverse to the first central axis.

15. A power steering assembly comprising: a housing;
a fixed bearing disposed within the housing and defining a first bore and a first central axis;
a worm including a first worm end and a second worm end, the worm being supported by the fixed bearing at the first worm end;
a worm gear disposed within the housing for meshing with the threaded portion of the worm; and
a floating bearing disposed within the housing and supporting the worm at the second worm end, the floating bearing defining a second bore and a second central axis, the floating bearing arranged within the housing to move between at least a first and a second position, the first position defined as a position in which the bearings are preloaded such that the second central axis is offset from the first central axis in a direction away from the worm gear, the second position defined as a position in which the bearings are arranged with one another such that the first central axis and the second central axis are coaxial in response to a load applied to the floating bearing.

16. The assembly of claim 15, wherein the second bore is sized to provide clearance for the floating bearing on at least one side of the floating bearing so the floating bearing may move within the second bore and relative to the first central axis.

17. The assembly of claim 15, wherein the first bore is sized to retain the fixed bearing in a fixed position relative to the worm.

18. The assembly of claim 15, wherein the floating bearing defines a bearing centerline oriented substantially transverse to the first central axis.

19. The assembly of claim 15 wherein the worm and the housing are arranged with one another such that the second worm end at least partially extends into the second bore.

20. The assembly of claim 15, wherein the bearings are preloaded by a spring located in an interior cavity of the housing.

* * * * *